United States Patent
Christopher et al.

[15] 3,692,351
[45] Sept. 19, 1972

[54] COOKING APPARATUS

[72] Inventors: Paul G. Christopher, 1850 Phillips Way, Los Angeles, Calif. 90042; Ronald E. Jelsvik, 16430 Superior St., Sepulveda, Calif. 91343

[22] Filed: May 17, 1971

[21] Appl. No.: 143,915

[52] U.S. Cl. ............... 296/23 R, 126/37 B, 126/41 R
[51] Int. Cl. ............................................. A47j 37/00
[58] Field of Search .126/25 R, 25 A, 38, 37 B, 41 R, 126/273 A, 276; 296/23 R, 22

[56] References Cited

UNITED STATES PATENTS

| | | | |
|---|---|---|---|
| 2,867,471 | 1/1959 | Coon, Jr. | 126/38 UX |
| 2,898,846 | 8/1959 | Del Francia | 126/41 R X |
| 2,915,960 | 12/1959 | McClellan, Jr. | 126/25 R X |
| 3,060,920 | 10/1962 | Dibert | 126/25 R X |
| 3,646,928 | 3/1972 | Grafton et al. | 126/38 X |

FOREIGN PATENTS OR APPLICATIONS 832,678  4/1960  Great Britain ............... 126/38

*Primary Examiner*—Charles J. Myhre
*Attorney*—Roger A. Marrs

[57] ABSTRACT

A cooking apparatus is disclosed herein having a stationary mounting unit carried on a motor vehicle for enclosing a cooking unit therein. A slide support is provided for mounting the cooking unit so that it will move laterally outward from the stationary unit to an in-use, exposed position. The cooking unit includes a grid for supporting a firebed of lava bricks or coals for supporting food intended to be cooked. A butane gas system is carried below the lava bricks for heating purposes.

6 Claims, 6 Drawing Figures

PATENTED SEP 19 1972 3,692,351

PAUL G. CHRISTOPHER
RONALD E. JELSVIK
INVENTORS

BY Roger A. Marrs

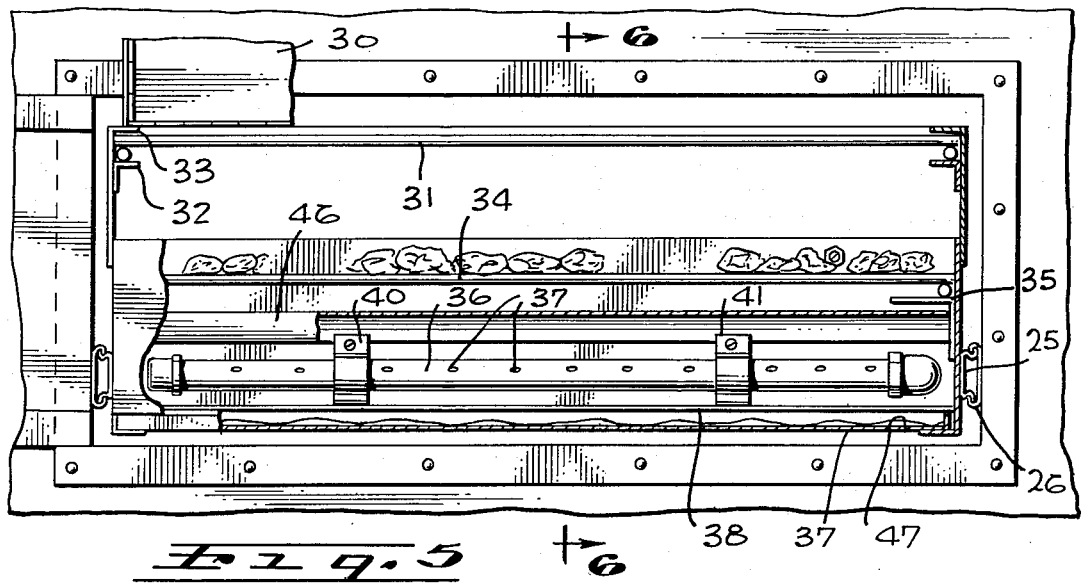
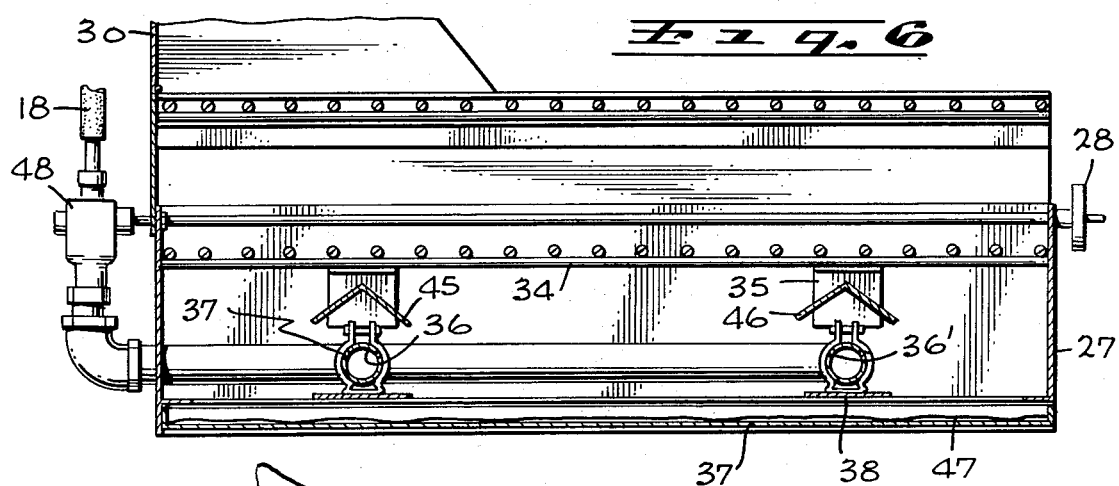
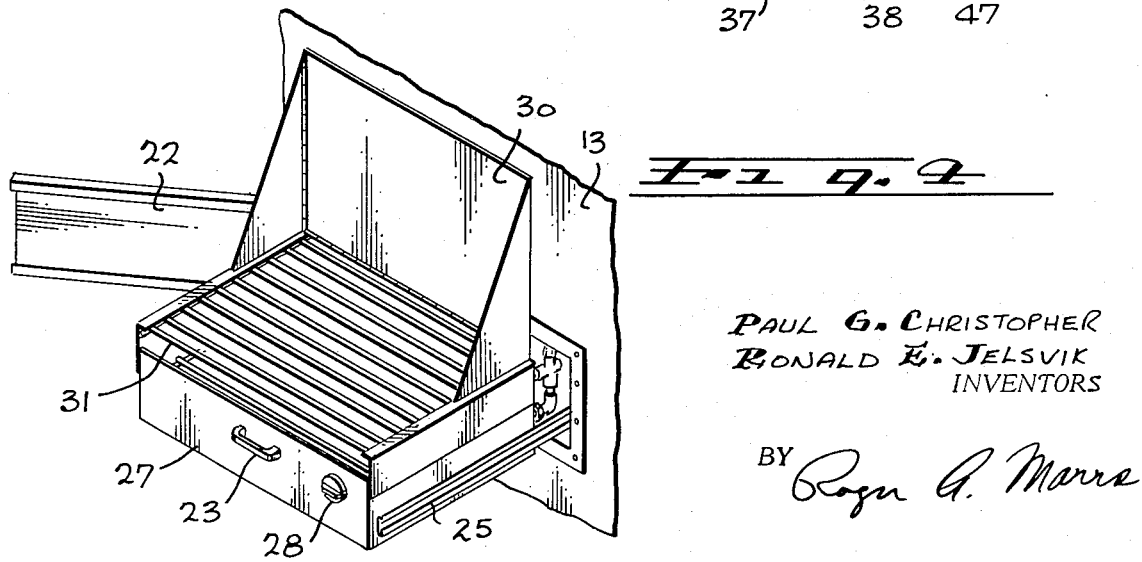

COOKING APPARATUS

BACKGROUND OF THE INVENTION

1. Field of the Invention

This invention relates to cooking apparatus and, more particularly, to an improved cooking apparatus of the broiler type carried on a recreational vehicle and laterally slidable from the side thereof to an exposed position for cooking.

2. Description of the Prior Art

In the culinary arts, many conventional cooking devices and apparatus have been employed for subjecting prepared food to heating so that the food will be properly cooked to satisfy a variety of eating tastes. In some instances, particularly when the cooking of meats is involved, the food requires a relatively thorough heating procedure to assure that the food is cooked not only on the outer surface thereof but the center or middle portion as well. One manner of providing a thorough heating procedure encompasses a barbecue arrangement wherein the meat is supported on a grill positioned over a firebed so that the heat radiates against the underside of the food product. This form of cooking is in wide use as a means for outdoor cooking and for this reason, a variety of barbecue devices are carried by persons owning and operating recreational vehicles.

Although these conventional devices work successfully for cooking meats, the devices are separate from the vehicle and require storage and physical removal from the vehicle for use. After cleaning and return to the vehicle for storage, it is difficult to tie down or otherwise render the device immobile during vehicular travel.

Another problem with conventional barbecue cooking devices resides in the fact that the firebox is extremely hot and must be cooled before the device is returned to the vehicle for storage. Cleaning of the device is also awkward and again, complicates the storage problem. Additionally, it is necessary not only to carry a barbecue cooking unit having a separate firebed, grill and cover but a separate supply of briquets as fuel and a separate can of starter fuel. All of this non-integrated equipment and supplies requires separate storage and handling for use and storage.

Therefore, it has been a long standing need to provide an integrated cooking apparatus of the broiler type which may be readily carried by a recreational vehicle so that it is self-contained and which is ready for use or storage without elaborate handling or preparation.

SUMMARY OF THE INVENTION

Accordingly, these difficulties and problems are overcome by the present invention wherein an improved cooking apparatus is provided which includes a stationary mounting unit that is secured to the side of a recreational vehicle and which includes means for slidably mounting a cooking unit within the confines of the mounting unit. A door is provided at one end of the mounting unit so that the cooking unit may be selectively slid outwardly in a lateral manner from the side of the vehicle when ready for use. The cooking unit comprises a grill for supporting food intended to be broiled and a butane gas heating system including pipes for discharging a flame under the cooking grill. Disposed midway between the cooking grill and the butane heating system, there is provided a grid for supporting a plurality of lava coals constituting the firebed of the apparatus. Suitable control are incorporated into the butane system for turning the gas ON and OFF so that the lava firebed may be ignited and heat maintained. Also, the grill may be readily removed and a cover may be provided to prevent splattering of greases during the cooking procedure. A removable tray is slidably carried beneath the heating system in a position to catch drippings during the cooking procedure.

Therefore, it is among the primary objects of the present invention to provide an improved cooking apparatus of the broiler type which provides unobstructed means for supporting food over a firebed so that heat from the firebed will adequately surround the food and cook the same.

Another object of the present invention is to provide an improved cooking apparatus which is slidably carried on a recreational vehicle and which is integral therewith so as to be self-contained.

Another object of the present invention is to provide an improved portable cooking unit which provides for the adequate containment of the fuel in the firebed such that the heat radiating therefrom is directed toward the food to be cooked and that the heat from the firebed does not become concentrated towards certain sensitive equipment or structure of the motor vehicle or the like which would be adversely affected by such concentrated heat.

Still another object of the present invention is to provide a novel portable cooking apparatus forming an integrated unit which is carried on a recreational vehicle and which is intended to be slid outwardly from the side of the vehicle in a cantilevered manner when ready for use.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

FIG. 4 is a view of the cooking unit fully extended and ready for use.

FIG. 5 is a front elevational view of the cooking unit taken immediately behind the front panel thereof.

FIG. 6 is a transverse cross-sectional view of the cooking unit as taken in the direction of arrows 6—6 of FIG. 5.

DESCRIPTION OF THE PREFERRED EMBODIMENT

Figure 1:
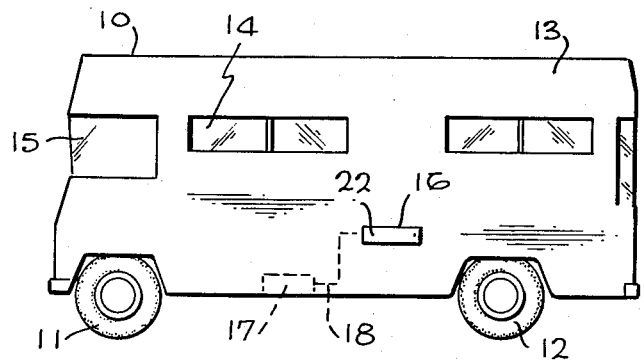
FIG. 1 is a side elevational view of a motor home vehicle incorporating the novel cooking apparatus of the present invention.

Referring now to FIG. 1, a typical recreational vehicle is illustrated which may take the form of a motor home 10 that includes wheel sets 11 and 12 for movably supporting the body and frame of the vehicle. The body includes a side 13 which may be provided with suitable windows 14, windshield 15 and/or a door (not shown). The side 13 of the body of the vehicle also serves to mount a cooking apparatus of the present invention as indicated by numeral 16. A butane gas supply is indicated by numeral 17 which is carried on the body of the vehicle and is connected to the cooking apparatus by means of conduit 18. By directly mounting the cooking apparatus 16 on side 13 of the vehicle, the cooking apparatus is integral therewith and is completely self-contained so that separate supplies of starting fuel, firebed fuel and the firebed itself are not required.

Figure 2:
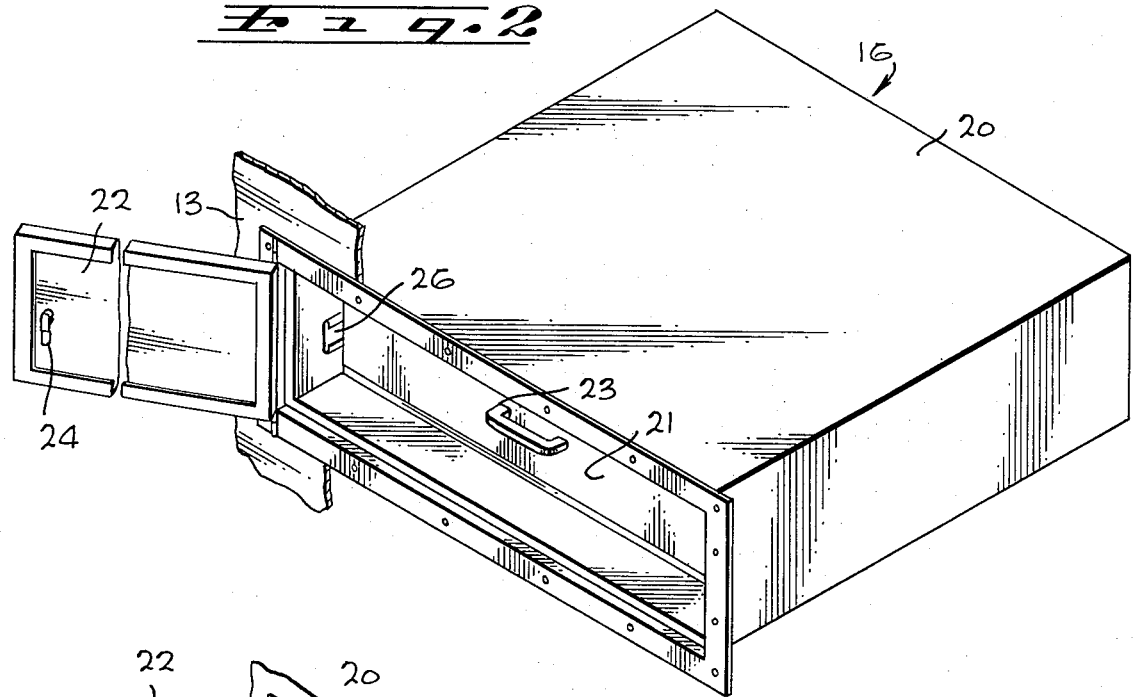
FIG. 2 is an enlarged perspective view of the cooking apparatus of FIG. 1 showing the access door open preparatory to laterally sliding the cooking unit out of the stationary mounting for use.

Referring now in detail to FIG. 2, the cooking apparatus 16 includes a stationary mounting enclosure 20 which is box-like so as to produce an enclosure for a cooking unit 21 when the apparatus is stored. The stationary mount 20 includes a front door 22 which is hingeably mounted along one side of an access opening leading into the interior of the mount 20 so as to define a passageway to permit the cooking unit 21 to be laterally moved out of the enclosure of the mounting 20. A handle 23 for permitting manual movement of the cooking unit to and from the stationary mount 20 is provided.

Preferably, the cooking apparatus 16 is disposed so that the major length or body of the unit extends into the interior of the vehicle so as to reside in an unobstructed area such as the inside of a cabinet or cupboard. The door 22 is exposed exteriorly of the vehicle and is preferably flush or coextensive with the side of the vehicle. A suitable lock or latch 24 may be provided on the end of the door 22 so that it may be readily locked to prevent access to the cooking unit when not in use. The stationary mount 20 is preferably composed of heat-resistant material so that the cooking unit 21 may be returned to the enclosure of the stationary mount 20 while still warm from a cooking procedure.

Figure 3:
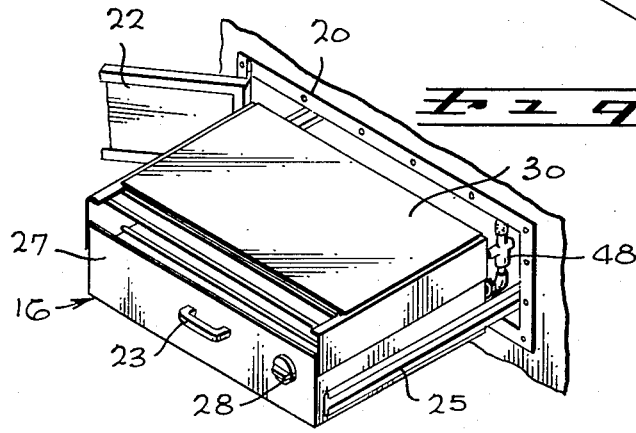
FIG. 3 is a view similar to the view of FIG. 2 showing the cooking unit outwardly cantilevered from the side of the vehicle.

In FIG. 3, the cooking unit 16 is illustrated as being withdrawn from the stationary mount 20 preparatory to cooking. It can be seen that the opposite sides of the cooking unit 16 are provided with slide members 25 that are slidably engageable with receptacles, such as receptacle 26 in FIG. 2. The sliding relationship of the guide 25 with receptacle 26 is in a type of tongue-in-groove relationship. The handle 23 is carried on a front panel 27 which extends between the opposite sides of the cooking unit. A gas control knob 28 is operatively connected into the butane system of the unit for turning the gas supply ON and OFF to the cooking unit.

Referring now in detail to FIG. 4, the unit is in position for a cooking procedure and it can be seen that a splatter panel 30 is provided which forms a cover in its stored position as shown in FIG. 3 and when expanded as shown in FIG. 4, prevents grease, heat or flame from impinging against the side 13 of the vehicle. The cooking unit includes a grill 31 composed of a plurality of spaced apart rods which are connected together at their opposite ends to form a single grill suitable for supporting food intended to be cooked.

Referring now to FIGS. 5 and 6 in detail, it can be seen that the cooking unit 16 includes a pair of spaced apart flanges 32 and 33 located at the top of each side of the unit and are aligned so as to provide a track into which the opposite ends of the grill 31 may be slid. Immediately below the grill 31 is the firebed support grid indicated by numeral 34 which may take the form of a plurality of spaced apart rods joined together at their opposite ends by transverse end rods so as to form a single unit. Preferably, the grid 34 is supported on its opposite ends by means of lateral supports or braces 35 which are of identical construction and secured to the opposing surfaces on the opposite sides of the cooking unit. Below the grid 34, there is provided a butane gas system taking the form of discharge pipe 36 having a plurality of gas outlets 37 which may be readily ignited, such as by using a match. The pipe 36 is supported on a strip 38 which employs a pair of spaced apart fixtures 40 and 41 for carrying the pipe 36. In FIG. 6, it can be seen that a pair of gas outlet pipes are provided as indicated by the numerals 36 and 36' since the pipes are identical.

It is to be noted that the gas pipes 36 and 36' are protected from food drippings or foreign debris that might otherwise collect in the discharge orifices 37 by means of elongated splash plates 45 and 46, respectively. Also, it is to be understood that the flame orifices in each of the pipes 36 and 36' are provided in a double row substantially along opposite sides of the pipe and are slightly canted or angularly disposed with respect to vertical so that the flame will project outwardly about the plates 45 and 46 to achieve their heating function. In addition, it is to be noted that a slidable drip pan 47 is provided which may be a separate pan or it may take the form of a piece of foil or other disposable material.

The butane gas is supplied to the cooking unit via conduit 18 and is joined to the pipes 36 and 36' by means of a shut-off valve 48. This shut-off valve is controlled by the knob via a control shaft 49 that is rotatably carried between the front and back sides of the cooking unit.

In view of the foregoing, it can be seen that a novel cooking apparatus is provided which is integral with the recreational vehicle and does not require separate briquets, starting fuel or a separate firebed. If desired, the unit may become portable by disconnecting the butane system and removing the cooking unit from the stationary mount, in which case the cooking unit may be placed on a table or other support and may be operated in any suitable conventional fashion. The firebed of the cooking unit may be provided with a heat resistant lining, such as firebrick or ceramic if desired, and the fuel for cooking which rests on the grid 34 may be any suitable fuel used in the cooking operation, such as, for example, charcoal, wood, coal, or the like, which constitutes a heating area. However, it is preferred that butane gas be employed since the heat of the combusted gas will heat the firebed area composed of the lava rock which does not have to be replaced after repeated uses.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. The combination of a motor vehicle body having a side outside wall provided with an elongated rectangular opening, and a barbecue comprising:

a horizontally elongated housing constituting a mounting unit disposed entirely interiorly of said body so as to fully occupy said wall opening;

said mounting unit being box-like having one end thereof open serving as an entrance leading to the interior thereof and said entrance being substantially flush with the exterior surface of said side outside wall;

a barbeque unit having a bottom supporting a continuous sidewall about its peripheral edge constituting opposite sidewalls, a rear panel and a front panel;

a pair of elongated tracks secured to the opposite sidewalls of said box-like mounting unit in opposing relationship;

slide means carried on the exterior surfaces of said barbeque unit sidewalls operatively engaged with said tracks for slidably carrying said barbeque unit on said mounting unit whereby said barbeque unit slides exteriorly of said mounting unit through said opening entrance in cantilevered supported relationship therewith to establish a cooking position and slides completely within said mounting unit in near abutting relationship with said mounting unit rear panel to establish a stored position;

a door pivotally carried on said vehicle body side wall accessible from the exterior of said vehicle body for selectively closing said mounting unit opening when said barbeque unit is in said stored position;

said barbeque unit further including a grill removably supported between said opposite sidewalls and a grid fixedly supported beneath said grill between said opposite sidewalls;

a plurality of coals carried on said grid constituting a firebed; and an ignitable gas system having a plurality of burners supported on said bottom immediately beneath said grid.

2. The invention as defined in claim 1 including a removable ash tray slidably carried on said barbeque unit bottom immediately below said burners.

3. The invention as defined in claim 1 wherein said gas system includes a supply of butane gas mounted on said vehicle body and a flexible length of hose connecting said gas supply to said burners; and said length of hose extendable upon sliding of said barbeque unit from said stored position to said cooking position.

4. The invention as defined in claim 1 including a shield of narrow width supported on said barbeque unit bottom and disposed over said burners.

5. The invention as defined in claim 3 wherein said gas system further includes a shut off valve.

6. The invention as defined in claim 1 including a splatter cover pivotally carried on said barbeque unit near said rear panel.

* * * * *